United States Patent
Albero et al.

(10) Patent No.: US 11,966,709 B2
(45) Date of Patent: Apr. 23, 2024

(54) APPARATUS AND METHODS TO CONTEXTUALLY DECIPHER AND ANALYZE HIDDEN MEANING IN COMMUNICATIONS

(71) Applicant: Bank of America Corporation, Charlotte, NC (US)

(72) Inventors: George Albero, Charlotte, NC (US); Olga Kocharyan, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 307 days.

(21) Appl. No.: 17/232,337

(22) Filed: Apr. 16, 2021

(65) Prior Publication Data

US 2022/0335229 A1 Oct. 20, 2022

(51) Int. Cl.
*G06F 40/30* (2020.01)
*G06F 16/951* (2019.01)
*G06F 40/284* (2020.01)
*G06F 40/49* (2020.01)

(52) U.S. Cl.
CPC ............ *G06F 40/49* (2020.01); *G06F 16/951* (2019.01); *G06F 40/284* (2020.01)

(58) Field of Classification Search
None
See application file for complete search history.

(56) References Cited

U.S. PATENT DOCUMENTS

| | | | |
|---|---|---|---|
| 6,173,251 B1 * | 1/2001 | Ito | G06F 16/30 704/7 |
| 6,385,629 B1 * | 5/2002 | Sundaresan | G06F 16/2465 707/999.006 |
| 6,493,693 B1 * | 12/2002 | Hill | G06Q 10/04 706/45 |
| 6,708,311 B1 * | 3/2004 | Berstis | G06F 40/232 715/236 |
| 6,785,869 B1 * | 8/2004 | Berstis | G06F 40/169 715/209 |
| 8,615,389 B1 | 12/2013 | Marcu | |
| 9,460,163 B1 * | 10/2016 | Toal | G06Q 30/0201 |

(Continued)

FOREIGN PATENT DOCUMENTS

CN 109347801 B * 3/2021 ......... H04L 63/1433

OTHER PUBLICATIONS

Liang Wu; Fred Morstatter; Huan Liu, SlangSD: Building and Using a Sentiment Dictionary of Slang Words for Short-Text Sentiment Classification, Aug. 17, 2016, Arizona State University, https://doi.org/10.48550/arXiv.1608.05129. (Year: 2016).*

*Primary Examiner* — Lamont M Spooner
(74) *Attorney, Agent, or Firm* — Weiss & Arons LLP (57) ABSTRACT

Apparatus and methods to decipher and analyze hidden/figurative meanings in communications using contextual analysis are provided. The apparatus and methods may include generating an initial list of slang words and phrases and their corresponding hidden/figurative meanings, searching the Internet for new slang words and phrases, determining the corresponding hidden/figurative meanings of the new slang words and phrases, and contextually analyzing a set of communications for hidden/figurative meaning. The apparatus and methods may include generating an alert if a relevant hidden/figurative meaning is found in the set of communications.

17 Claims, 6 Drawing Sheets

(56) References Cited

U.S. PATENT DOCUMENTS

| | | | |
|---|---|---|---|
| 9,747,275 B1* | 8/2017 | Barsness | H04L 51/52 |
| 10,261,994 B2 | 4/2019 | Marcu et al. | |
| 10,388,272 B1* | 8/2019 | Thomson | G10L 15/22 |
| 10,402,498 B2 | 9/2019 | Marcu et al. | |
| 2002/0116629 A1* | 8/2002 | Bantz | G06Q 30/02 |
| | | | 726/26 |
| 2003/0204719 A1* | 10/2003 | Ben-Itzhak | H04L 63/0281 |
| | | | 726/30 |
| 2006/0106866 A1* | 5/2006 | Green | H04L 67/02 |
| | | | 709/224 |
| 2007/0043736 A1 | 2/2007 | Jain | |
| 2009/0089417 A1* | 4/2009 | Giffin | H04L 51/212 |
| | | | 709/224 |
| 2014/0278341 A1* | 9/2014 | Ranjan | G06F 40/51 |
| | | | 704/2 |
| 2014/0280638 A1* | 9/2014 | O'Dell | H04L 51/212 |
| | | | 709/206 |
| 2015/0081723 A1* | 3/2015 | Ogawa | G06F 16/284 |
| | | | 709/204 |
| 2015/0142590 A1* | 5/2015 | Gray | G06Q 30/0631 |
| | | | 705/21 |
| 2017/0214701 A1 | 7/2017 | Hasan | |
| 2017/0351816 A1* | 12/2017 | Fink | G16H 40/63 |
| 2018/0047395 A1* | 2/2018 | Sommers | G06V 20/20 |
| 2018/0152557 A1* | 5/2018 | White | H04L 12/282 |
| 2018/0232359 A1* | 8/2018 | Crudele | G06F 40/284 |
| 2018/0288073 A1* | 10/2018 | Hopper | H04L 63/1425 |
| 2019/0074006 A1* | 3/2019 | Kumar | G06F 3/167 |
| 2019/0124022 A1* | 4/2019 | Bisaillion | G06F 3/0482 |
| 2019/0179898 A1* | 6/2019 | Jetley | G06F 9/453 |
| 2019/0179958 A1* | 6/2019 | Curzi | G06F 16/31 |
| 2019/0236206 A1* | 8/2019 | Chowdhury | G06F 40/242 |
| 2020/0128047 A1* | 4/2020 | Biswas | H04L 67/10 |
| 2020/0175961 A1* | 6/2020 | Thomson | G10L 15/28 |
| 2020/0411191 A1* | 12/2020 | Balian | G06N 5/02 |
| 2021/0011976 A1* | 1/2021 | Brake | G06F 40/242 |
| 2021/0248703 A1* | 8/2021 | Esplin | G06F 40/284 |
| 2021/0366467 A1* | 11/2021 | Lin | G06F 18/23 |
| 2021/0390553 A1* | 12/2021 | Brinig | G06F 40/169 |
| 2022/0012437 A1* | 1/2022 | Kim | G06F 40/42 |
| 2022/0092578 A1* | 3/2022 | Ashok | G06F 9/454 |
| 2022/0301557 A1* | 9/2022 | Braganza | G10L 15/1815 |

* cited by examiner

APPARATUS AND METHODS TO CONTEXTUALLY DECIPHER AND ANALYZE HIDDEN MEANING IN COMMUNICATIONS

FIELD OF TECHNOLOGY

Aspects of the disclosure relate to contextually deciphering and analyzing hidden/figurative meaning(s) in communications, in any language.

BACKGROUND OF THE DISCLOSURE

People often communicate using language that does not lend itself to easy interpretation by computers and software. Words or phrases may often have one, dictionary (literal), meaning, but in certain uses may have an entirely different, idiomatic (or "slang") hidden/figurative meaning. The meaning may be hidden from computers and software, including artificial intelligence programs.

Hidden/figurative meanings may cause problems with existing natural language processing ("NLP") programs by causing these programs to miss and misinterpret the import of various communications. For example, existing NLP programs may interpret the phrase "wash the car" as innocuous, even though the communicator may actually be discussing money laundering. Similarly, a frustrated user may tell an interactive communication bot to "take a hike." Existing NLP programs may literally interpret this statement and become confused, although it has a clear hidden/figurative meaning to fluent English speakers. Similar idiomatic phrases are present in every language. Existing NLP programs are limited to literal interpretations of communications.

Further, language is constantly evolving, and new slang/idiomatic words and phrases are constantly being created. Simply providing an NLP program with various slang terms and their hidden/figurative meanings may be insufficient to accurately process communications.

Therefore, it would be desirable for apparatus and methods to decipher hidden/figurative meaning in communications and periodically update a database containing slang words or phrases and their corresponding hidden/figurative meanings.

SUMMARY OF THE DISCLOSURE

It is an object of this disclosure to provide apparatus and methods to contextually decipher and analyze hidden/figurative meaning in communications.

A method for deciphering hidden meaning in communications, utilizing the Internet, is provided. The method may include generating, at a centralized server, an initial list of slang words or phrases. The initial list may be in any language, such as English, or combination of languages, and preferably would be in a single language. The initial list may include the corresponding hidden/figurative meaning of each slang word or phrase on the initial list. The initial list may be generated through any appropriate method, including manual entry, receiving the initial entries from an outside source, sourcing the initial entries from a particular website or websites, or any other appropriate method. The initial list, including slang words and phrases and their corresponding meaning(s), may be stored in memory at the centralized server.

The method may include searching the Internet using an artificial intelligence ("AI") decipher engine for new slang words or phrases that do not appear on the initial list. The AI decipher engine may be located at the centralized server, may be text-based, and may utilize any appropriate AI or machine learning algorithm. The searching may occur at pre-determined periods, such as, for example, hourly, daily, weekly, monthly. In an embodiment, the searching may occur continuously. The searching may occur on a particular portion of the Internet (such as a website or websites) or a substantial portion of the Internet. In an embodiment, the entire Internet may be searched. The AI decipher engine may search for new slang words or phrases by finding a new usage of a word or phrase, analyzing the new usage in context with surrounding words or phrases and the location on the Internet where the new usage was found, and confirming if the new usage in context matches a known meaning of the word or phrase, or not. If the AI decipher engine determines that, contextually, the new usage does not match a known meaning, it may determine that the new usage is a new slang word or phrase.

After discovering one or more new slang words or phrases, the method may include determining, at the centralized server, the corresponding hidden/figurative meaning of the new slang words or phrases. The method may include storing, in a database at the centralized server, the new slang words or phrases and their corresponding hidden/figurative meaning and updating the initial list with the new slang words or phrases and their corresponding hidden/figurative meaning to form an updated version of the initial list.

In some embodiments, the corresponding hidden/figurative meaning of the new slang words may be determined by the AI decipher engine discovering a definition on the Internet. For example, a particular website may have a partial list of slang words or phrases along with their corresponding meaning. This may be the least resource intensive method of determining the hidden/figurative meaning of slang words or phrases but may not be comprehensive. In an embodiment, this may be the first route the AI decipher engine tries when determining the hidden/figurative meaning of the new slang words.

In an embodiment, the corresponding hidden/figurative meaning of the new slang words may be determined at the centralized server and using the AI decipher engine by contextually analyzing usage of the new slang word on the Internet. The AI decipher engine may analyze usage of the new slang words or phrases by viewing the usage in context with surrounding words, sentences, or paragraphs. In addition, context may be gleaned by looking at where, when, and by whom the new slang word was communicated. For example, certain websites or forums may limit discussions to certain topics and a new slang word may have a hidden/figurative meaning based on the limited topics.

In an embodiment, the corresponding hidden/figurative meaning of the new slang words may be determined by the centralized server alerting a user that the server and AI decipher engine could not determine the corresponding hidden/figurative meaning and receiving the corresponding hidden/figurative meaning from the user. If the AI decipher engine is unable to determine the corresponding hidden/figurative meaning, a human in the loop may be able to provide the corresponding hidden/figurative meaning.

In an embodiment, the corresponding hidden/figurative meaning of the new slang words may be determined by the AI decipher engine crowd-sourcing the meaning to one or more websites on the Internet. For example, the AI decipher engine may automatically post a query as to the corresponding hidden meaning of a new slang word or phrase on one or more web sites, and after a pre-determined amount of time (such as a day or a week) accepting the most common crowd-sourced answer.

In an embodiment, the searching by the AI decipher engine may be limited to a pre-determined portion of the Internet. For example, the AI decipher engine may limit its searching to particular websites, or all or part of the "dark web." The dark web is a part of the Internet not indexed by search engines and comprises publicly visible websites that hide internet protocol ("IP") addresses of servers that run the web sites.

In some embodiments the method may include generating and storing, in a database at the centralized server a relevant slang list from the updated version of the initial list. Slang words or phrases may be deemed relevant by the AI decipher engine by comparing the corresponding hidden meaning for each slang word or phrase on the updated list to a pre-determined list of relevant terms provided to the AI decipher engine. For example, a financial institution may be interested in slang words or phrases that implicate fraud, money laundering, or other criminal activity. If a slang word or phrase's corresponding hidden/figurative meaning has one of these terms, the slang word or phrase may be added to the relevant slang list. As not all slang may be relevant for all users (e.g., a school may be interested in academic dishonesty but uninterested in money laundering), a relevant slang list may allow for faster and more accurate language processing.

In some embodiments, the method may include analyzing, at the centralized server, a set of past or present communications by at least one user in order to discover any hidden/figurative meanings in the communications. The AI decipher engine may accomplish this analysis by comparing the contents of the communications with the relevant slang list, or the initial and updated slang lists. The communications may be email, text messages, chat contents, voice messages or phone calls (converted from audio to text by any appropriate speech-to-text method), or video (converted from video/audio to text by any appropriate speech-to-text method). With enough processing power, real-time text and audio conversations (including video) may be analyzed in real-time.

In an embodiment, if a match between the words of the communication(s) and the relevant slang list is found, a security protocol may be activated. In an embodiment, the security protocol may include alerting a physical security entity (e.g., a security guard) in real-time. For example, if a customer walks into a financial institution, says a slang word or phrase with a hidden/figurative meaning of performing a criminal act which is captured by a security camera, the speech may be analyzed by the AI decipher engine, and physical security may be alerted to the customer.

In an embodiment, the method may include the security protocol pulling all accessible communications by an author (e.g., a customer, student, employee etc.) and analyzing the entire set of accessible communications for hidden/figurative meaning. For example, if one communication is flagged as containing a hidden/figurative meaning, the security protocol may include analyzing every other accessible communication by the author of the flagged communication to discover any further hidden/figurative meanings. Contextual analysis of the entire corpus of communications by the author may provide contextual clues as to the hidden/figurative meanings, if any.

Apparatus/systems for deciphering hidden/figurative meaning in communications, utilizing the "Internet" are provided. The apparatus may include a central server. The central server may include a communication link arranged to access the Internet, a memory, a text-based AI decipher engine, and a processor. The memory may be RAM, ROM, or other appropriate memory. The memory may store an initial list of slang words or phrases in a target language and their corresponding hidden/figurative meaning. The memory may be a database. The memory may also store an operating system and the AI decipher engine. The processor may be coupled to the memory and run the operating system and AI decipher engine. The processor may be single-core or multiple core. The AI decipher engine may be arranged to periodically or continuously search the Internet for new slang words or phrases, determine a corresponding hidden/figurative meaning for the new slang words or phrases, and analyze a set of communications for hidden/figurative meaning. The processor may communicate the results of the analysis by the AI decipher engine, and store, in the memory, the new slang words or phrases and their corresponding hidden/figurative meaning as an update to the initial list.

In an embodiment, if a hidden/figurative meaning is found in the set of communications, the processor may activate a security protocol.

In an embodiment, the AI decipher engine may search for new slang words or phrases by, at minimum, finding a new usage of a word or phrase on the Internet, contextually analyzing the new usage in context with surrounding words or phrases, and determining if the new usage in context matches a known meaning of the word or phrase. If the new usage does not match a known meaning in context, the AI decipher engine may treat the new usage as a new slang word or phrase.

In an embodiment, the AI decipher engine may analyze a set of communications (text or audiovisual based, if converted to text) for hidden/figurative meanings by, at minimum, comparing the set of communications with a list of slang words or phrases (both the initial list and the new findings) and finding each instance of a slang word or phrase in the set of communications, and determining if each slang word or phrase found in the set of communications has a standard meaning or hidden/figurative meaning. The AI decipher engine may make this determination by analyzing each instance of a slang word or phrase in context. Context may be with the entire set of communications in which the slang word or phrase is found, with the words surrounding the slang word or phrase, with the sentence or paragraph, and may include who wrote the communication, when it was written, and where it was found, among other contextual clues.

In some embodiments, the corresponding hidden/figurative meaning of the new slang words may be determined by the AI decipher engine discovering a definition on the Internet. In an embodiment, the corresponding hidden/figurative meaning of the new slang words may be determined by the AI decipher engine contextually analyzing usage of the new slang word on the Internet. The AI decipher engine may analyze usage of the new slang words or phrases by viewing the usage in context with surrounding words, sentences, or paragraphs. In addition, context may be gleaned by looking at where, when, and by whom the new slang word was communicated.

In an embodiment, the corresponding hidden/figurative meaning of the new slang words may be determined by the centralized server alerting a user that the server and AI decipher engine could not determine the corresponding hidden/figurative meaning and receiving the corresponding hidden/figurative meaning from the user. If the AI decipher engine is unable to determine the corresponding hidden/ figurative meaning, a human in the loop may be able to provide the corresponding hidden/figurative meaning.

In an embodiment, the corresponding hidden/figurative meaning of the new slang words may be determined by the AI decipher engine crowd-sourcing the meaning to one or more websites on the Internet. For example, the AI decipher engine may automatically post a question as to the corresponding hidden meaning of a new slang word or phrase on one or more web sites, and after a pre-determined amount of time (such as a day or a week) accepting the most common crowd-sourced answer.

A method of deciphering hidden meaning in a communication is provided. The method may include generating, at a centralized server, a list of slang words or phrases in a target language and their corresponding hidden meaning. The method may include receiving, at the centralized server, a set of communications from at least one author comprising at least one word in the target language. The method may include analyzing, at the centralized server using an AI decipher engine, the set of communications and determining if the set of communications contains a hidden meaning. If the set of communications does contain a hidden meaning, activating a security protocol. The analysis of the set of communications may include comparing the at least one word to the list of slang words or phrases and noting each instance of a slang word or phrase from the list in the set of communications. The analysis may also include determining if each instance of the slang word or phrase found in the set of communications has a standard meaning or hidden meaning in context with the set of communications in which the slang word or phrase is found.

In an embodiment, the method may include the security protocol pulling a set of all accessible communications by the author and analyzing the entire set of all accessible communications for hidden meaning.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

A method for deciphering hidden meaning in communications, utilizing the Internet, is provided. The method may include generating, at a centralized server, an initial list of slang words or phrases in a particular language, or multiple languages. Slang words or phrases may also include acronyms, such as "LOL" (meaning "laugh out loud"). The initial list may be in any language, such as English, or combination of languages, and preferably would be in a single language. The initial list should preferably include the corresponding hidden/figurative meaning(s) of each slang word or phrase. The list may also include the standard definition of the word or phrase.

In this disclosure, a reference to a "hidden meaning" may be interchangeable with a reference to a "figurative meaning." Hidden/figurative meaning may refer to a meaning of a word or phrase that is not necessarily the literal meaning of the word or phrase. For example, saying "don't look a gift horse in the mouth," does not usually mean what it literally says. In modern English usage, this phrase may mean do not go out of the way to find fault with a potential opportunity or gift. Another example may be the phrase "forge ahead." This is usually interpreted as "move forward" or continue doing what the person is already doing, instead of its literal meaning that there is a (metal) forge ahead. Another example might be a customer saying, "I want to check my balance." To a financial institution, this might mean the customer desires to know the amount of funds in a particular account. However, to a physical therapist or an ENT doctor, this might mean the customer needs to check their physical balance while walking or standing.

In an embodiment, instead of a centralized server, the method may utilize a distributed network of multiple servers to increase processing power, speed, and memory.

The initial list may be generated through any appropriate method, including manual entry, receiving the initial entries from an outside source, sourcing the initial entries from a particular website or websites, or any other appropriate method. The initial list, including slang words and phrases and their corresponding meaning(s), may be stored in memory, including a database, at the centralized server. The initial list may be updated at any time.

In an embodiment, in addition to or instead of slang words or phrases, slang gestures or symbols may also be included. Slang gestures or symbols may include emojis/emoticons or graphical/text representations of emojis/emoticons. Some emojis/emoticons may have a particular meaning, others may have multiple meanings, and some may have different meanings in different combinations. Slang gestures may also include audiovisual gestures captured by a video-camera. In an embodiment, slang gestures may be translated to machine-readable text through any appropriate method, including machine-learning.

The method may include searching the Internet using an artificial intelligence ("AI") decipher engine for new slang words or phrases that do not appear on the initial list. The AI decipher engine may be text-based. In an embodiment including slang gestures or symbols, the AI decipher engine may be image-based in addition to text-based.

The AI decipher engine may be located at the centralized server or distributed across multiple servers and may utilize any appropriate AI or machine learning algorithm. The searching may occur at pre-determined periods, such as, for example, hourly, daily, weekly, monthly. In an embodiment, the searching may occur continuously.

In an embodiment, the AI decipher engine may be any suitable artificial intelligence or machine-learning ("ML") tool that enables a computation based on training data and other data. In an embodiment, the AI decipher engine may be configured to compute a score for new usages of words or phrases retrieved in a search of the Internet. The score may indicate a likelihood that the new usage of the words or phrases contains a hidden/figurative meaning or not. If the score is low, the likelihood of the new usage containing a hidden/figurative meaning (and as such, being a new slang word or phrase) is low. If the score is high, the likelihood of the new usage containing a hidden/figurative meaning and being a new slang word or phrase, is high. The high or low score may be generated by the AI decipher engine using contextual analysis. Generally, if the AI decipher engine believes a new usage is a non-sequitur (i.e., it does not make sense in context, as e.g., if a communication is talking about going for a walk and then starts talking about washing a car, the washing the car does not make sense in context and is a non-sequitur), the score may be higher. Alternatively, high and low scores may be switched; the only necessity is that the scores be different for usages containing a hidden/figurative meaning and those that do not.

In an embodiment, the AI decipher engine may be trained, using any appropriate machine-learning method, to perform the contextual analysis and any other analysis or determination.

In an embodiment, the AI decipher engine may include an indexing function. The indexing function may enable the AI decipher engine to index (or remember) which websites or webpages it has already searched so that they will not be searched again. If the AI decipher engine indexes its searches, it is anticipated that the initial search will take the longest amount of time, and subsequent searches will become progressively shorter, as there will be fewer webpages to search.

The AI decipher engine may search for new slang words or phrases by finding a new usage of a word or phrase, analyzing the new usage in context with surrounding words or phrases and the location on the Internet where the new usage was found, and determining if the new usage in context matches a known meaning of the word or phrase. If the AI decipher engine determines that, contextually, the new usage does not match a known meaning, it may determine that the new usage is a new slang word or phrase.

After discovering new slang words or phrases, the method may include determining, at the centralized server, the corresponding hidden/figurative meaning of the new slang words or phrases. In an embodiment, the AI decipher engine may perform this determination. This determination may be performed in any appropriate method and several methods are described in detail below.

In an embodiment, the method may include storing, in a database at the centralized server, the new slang words or phrases and their corresponding hidden/figurative meaning and updating the initial list with the new slang words or phrases and their corresponding hidden/figurative meaning to form an updated version of the initial list.

In an embodiment, this updated list may become the new initial list the next time the AI decipher engine searches the Internet for new slang words or phrases.

In some embodiments, the corresponding hidden/figurative meaning of the new slang words may be determined by the AI decipher engine discovering a definition on the Internet. For example, a particular website may have a partial list of slang words or phrases along with their corresponding meaning. This may be the least resource intensive method of determining the hidden/figurative meaning of slang words or phrases but may not be comprehensive enough. In an embodiment, this may be the first route the AI decipher engine tries when determining the hidden/figurative meaning of the new slang words.

In an embodiment, the AI decipher engine may be instructed to visit a particular website or websites that may be anticipated to have slang words or phrases along with their corresponding meaning. In an embodiment, the initial list may be generated by visiting one or more of these websites and transferring their database of slang words and meanings to the centralized server's memory.

In an embodiment, the corresponding hidden/figurative meaning of the new slang words may be determined at the centralized server and using the AI decipher engine by contextually analyzing usage of the new slang word on the Internet. The AI decipher engine may analyze usage of the new slang words or phrases by viewing the usage in context with surrounding words, sentences, or paragraphs. In addition, context may be gleaned by looking at where, when, to whom and by whom the new slang word was communicated. For example, certain websites or forums may limit discussions to certain topics and a new slang word may have a hidden/figurative meaning based on the limited topics. In addition, historical records of the author may be useful in the contextual analysis, although historical records may not always be available.

In an embodiment, the corresponding hidden/figurative meaning of the new slang words may be determined by the centralized server alerting a human user that the server and AI decipher engine could not determine the corresponding hidden/figurative meaning and receiving the corresponding hidden/figurative meaning from the user. If the AI decipher engine is unable to determine the corresponding hidden/figurative meaning, a human in the loop may be able to provide the corresponding hidden/figurative meaning.

In an embodiment, the AI decipher engine may place a time limit on receiving a response from the user, and if no response is received within that time limit, the AI decipher engine may approach a different user. In an embodiment, The AI decipher engine may initially alert multiple users instead of a single user.

In an embodiment, the corresponding hidden/figurative meaning of the new slang words may be determined by the AI decipher engine crowd-sourcing the meaning to one or more websites on the Internet. For example, the AI decipher engine may automatically post a question as to the corresponding hidden meaning of a new slang word or phrase on one or more web sites, and after a pre-determined amount of time (such as a day or a week) accepting the most common crowd-sourced answer. In an embodiment, the AI decipher engine may accept the most discussed answer, or the highest ranked answer, as opposed to the most common answer. In an embodiment, the AI decipher engine may accept multiple answers instead of a single answer. In an embodiment, the AI decipher engine may hide the origin of the question by posing as an innocuous user when posting the question. In an embodiment, the AI decipher engine may reveal the origin(s) of the question.

In an embodiment, the crowd in the crowd-sourced answer may be a particular group, including an internal group within an organization running the AI decipher engine. For example, if a school is running the AI decipher engine, the engine may post a question as to the corresponding hidden meaning to an internal website only available to employees of the school.

In an embodiment, the searching by the AI decipher engine may be limited to a pre-determined portion of the Internet. Otherwise, the searching may include the entire accessible Internet. For example, the AI decipher engine may limit its searching to particular websites, or all or part of the "dark web." The dark web is a part of the Internet not indexed by search engines and comprises publicly visible websites that hide internet protocol ("IP") addresses of servers that run the websites. In an embodiment, the searching by the AI decipher engine may be limited to an internal network that is not connected to the Internet, or generally available to the public.

In some embodiments the method may include generating and storing, in a database at the centralized server, a relevant slang list from an updated version of the initial list. Slang words or phrases may be deemed relevant by the AI decipher engine by comparing the corresponding hidden meaning for each slang word or phrase on the updated list to a predetermined list of relevant terms provided to the AI decipher engine. For example, a financial institution may be interested in slang words or phrases that implicate fraud, money laundering, or other criminal activity. If a slang word or phrase's corresponding hidden/figurative meaning has one of these terms, the slang word or phrase may be added to the relevant slang list. As not all slang may be relevant for all users (e.g., a school may be interested in academic dishonesty but uninterested in money laundering, or a retail store may be interested in embezzlement but not academic dishonesty), a relevant slang list may allow for faster and more accurate language processing.

In an embodiment, the relevant slang list may be updated periodically, such as daily, monthly, or weekly, or continuously as slang terms are added to the list stored by the server. In an embodiment, the relevant slang list may be updated prior to every analysis of a communication in order to use the most up-to-date relevant slang list in the analysis.

In some embodiments, the method may include analyzing, at the centralized server, a set of past or present communications by at least one author in order to discover any hidden/figurative meanings in the communications. The AI decipher engine may accomplish this analysis by comparing the contents of the communications with the relevant slang list, or the initial and updated slang lists. The communications may be email, text messages, chat contents, voice messages or phone calls (converted from audio to text by any appropriate speech-to-text method), or video (converted from audio to text by any appropriate speech-to-text method). With enough processing power, real-time text and audio conversations (including video) may be analyzed in real-time.

In an embodiment, the analysis may include contextually analyzing a particular communication or set of communications in a similar manner as the contextual analysis of the new slang words or phrases. For example, the AI decipher engine may analyze the communication to discover usage of slang words or phrases by viewing the usage in context with surrounding words, sentences, or paragraphs. If there is a non-sequitur, the engine may decide it is more likely than not that there is a hidden/figurative meaning. In addition, context may be gleaned by looking at where, when, to whom and by whom the new slang word was communicated. For example, a communication between a banker and a customer may have a different context than a communication between two bankers or two customers. In addition, historical records of the author may be useful in the contextual analysis, although historical records may not always be available.

In an embodiment, if a match between the contents the communication(s) and the relevant slang list is found, a security protocol may be activated. In an embodiment, the security protocol may include alerting physical security in real-time. For example, if a customer walks into a financial institution, says a slang word or phrase with a hidden/figurative meaning of performing a criminal act which is captured by a security camera, the speech may be analyzed by the AI decipher engine, and physical security may be alerted to the customer. In another example, if an email is analyzed and contains a hidden meaning that a crime will be committed at a particular time, security or police may be contacted by the security protocol. In an embodiment, instead of alerting physical security, the security protocol may alert an authority figure. For example, in a school setting, if a discussion regarding cheating is discovered, a teacher or principal may be alerted.

In an embodiment, the method may include the security protocol pulling all accessible communications by an author (e.g., a customer, student, employee etc.) and analyzing the entire set of accessible communications for hidden/figurative meaning. For example, if one communication is flagged as containing a hidden/figurative meaning, the security protocol may include analyzing every other accessible communication by the author of the flagged communication to discover any further hidden/figurative meanings. This security protocol may help discover a pattern of activity and help the AI decipher engine with its contextual analysis.

In an embodiment, the method may include the security protocol locking out an author from an internal network, email, or access to internal resources.

Apparatus for deciphering hidden/figurative meaning in communications, utilizing the Internet are provided. The apparatus may include a central server. In an embodiment, the server may be distributed across multiple physical servers. The central server may include a communication link arranged to access the Internet, a memory, a text-based AI decipher engine, and a processor. The memory may be RAM, ROM, or other appropriate memory. The memory may store an initial list of slang words or phrases in a target language and their corresponding hidden/figurative meaning. The memory may include a database. The memory may also store an operating system, the AI decipher engine, and a security protocol.

The processor may be coupled to the memory and run the operating system, AI decipher engine, and security protocol. The AI decipher engine may be arranged to periodically or continuously search the Internet for new slang words or phrases, determine a corresponding hidden/figurative meaning for the new slang words or phrases, and analyze a set of communications for hidden/figurative meaning. The processor may communicate the results of the analysis by the AI decipher engine, and store, in the memory, the new slang words or phrases and their corresponding hidden/figurative meaning as an update to the initial list In an embodiment, if a hidden/figurative meaning is found in the set of communications, the processor may activate a security protocol.

In an embodiment, the AI decipher engine may search for new slang words or phrases by, at minimum, finding a new usage of a word or phrase on the Internet, contextually analyzing the new usage in context with surrounding words or phrases, and determining if the new usage in context matches a known meaning of the word or phrase. If the new usage does not match a known meaning in context, the AI decipher engine may treat the new usage as a new slang word or phrase.

In an embodiment, the AI decipher engine may analyze a set of communications (text or audio based, if converted to text) for hidden/figurative meanings by, at minimum, comparing the set of communications with a list of slang words or phrases (both the initial list and the new findings) and finding each instance of a slang word or phrase in the set of communications, and determining if each slang word or phrase found in the set of communications has a standard meaning or hidden/figurative meaning. The AI decipher engine may make this determination by analyzing each instance of a slang word or phrase in context. Context may be with the entire set of communications in which the slang word or phrase is found, with the words surrounding the slang word or phrase, with the sentence or paragraph, and may include who wrote the communication, when it was written, and where it was found, among other contextual clues.

In some embodiments, the corresponding hidden/figurative meaning of the new slang words may be determined by the AI decipher engine discovering a definition on the Internet. In an embodiment, the corresponding hidden/figurative meaning of the new slang words may be determined by the AI decipher engine contextually analyzing usage of the new slang word on the Internet. The AI decipher engine may analyze usage of the new slang words or phrases by viewing the usage in context with surrounding words, sentences, or paragraphs. In addition, context may be gleaned by looking at where, when, and by whom the new slang word was communicated.

In an embodiment, the corresponding hidden/figurative meaning of the new slang words may be determined by the centralized server alerting a user that the server and AI decipher engine could not determine the corresponding hidden/figurative meaning and receiving the corresponding hidden/figurative meaning from the user. If the AI decipher engine is unable to determine the corresponding hidden/figurative meaning, a human in the loop may be able to provide the corresponding hidden/figurative meaning.

In an embodiment, the corresponding hidden/figurative meaning of the new slang words may be determined by the AI decipher engine crowd-sourcing the meaning to one or more websites on the Internet. For example, the AI decipher engine may automatically post a question as to the corresponding hidden meaning of a new slang word or phrase on one or more web sites, and after a pre-determined amount of time (such as a day or a week) accepting the most common crowd-sourced answer.

A method of deciphering hidden meaning in a communication is provided. The method may include generating, at a centralized server, a list of slang words or phrases in a target language and their corresponding hidden meaning. The method may include receiving, at the centralized server, a set of communications from at least one author comprising at least one word in the target language. The method may include analyzing, at the centralized server using an AI decipher engine, the set of communications and determining if the set of communications contains a hidden meaning. If the set of communications does contain a hidden meaning, activating a security protocol. The analysis of the set of communications may include comparing the at least one word to the list of slang words or phrases and noting each instance of a slang word or phrase from the list in the set of communications. The analysis may also include determining if each instance of the slang word or phrase found in the set of communications has a standard meaning or hidden meaning in context with the set of communications in which the slang word or phrase is found.

In an embodiment, the method may include the security protocol pulling a set of all accessible communications by the author and analyzing the entire set of all accessible communications for hidden meaning.

In an embodiment, the AI decipher engine may be utilized to increase the accuracy and responsiveness of existing natural language processing ("NLP") algorithms. For example, the AI decipher engine may be an additional tool to create more accurate analysis and responsiveness of AI customer service agents and systems. The AI decipher engine may be an additional layer of processing that can assist the NLP algorithm in deciphering and responding to communication inputs. Instead of relying on a 'literal' interpretation of communication inputs, the AI decipher engine can discern the hidden/figurative meaning of slang words or phrases to create a more accurate interpretation of a communication.

In an embodiment, instead of activating a security protocol when a hidden/figurative meaning is detected, the AI decipher engine may send its interpretation of a communication to an existing NLP algorithm, and the NLP algorithm can use the interpretation to formulate a better response.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
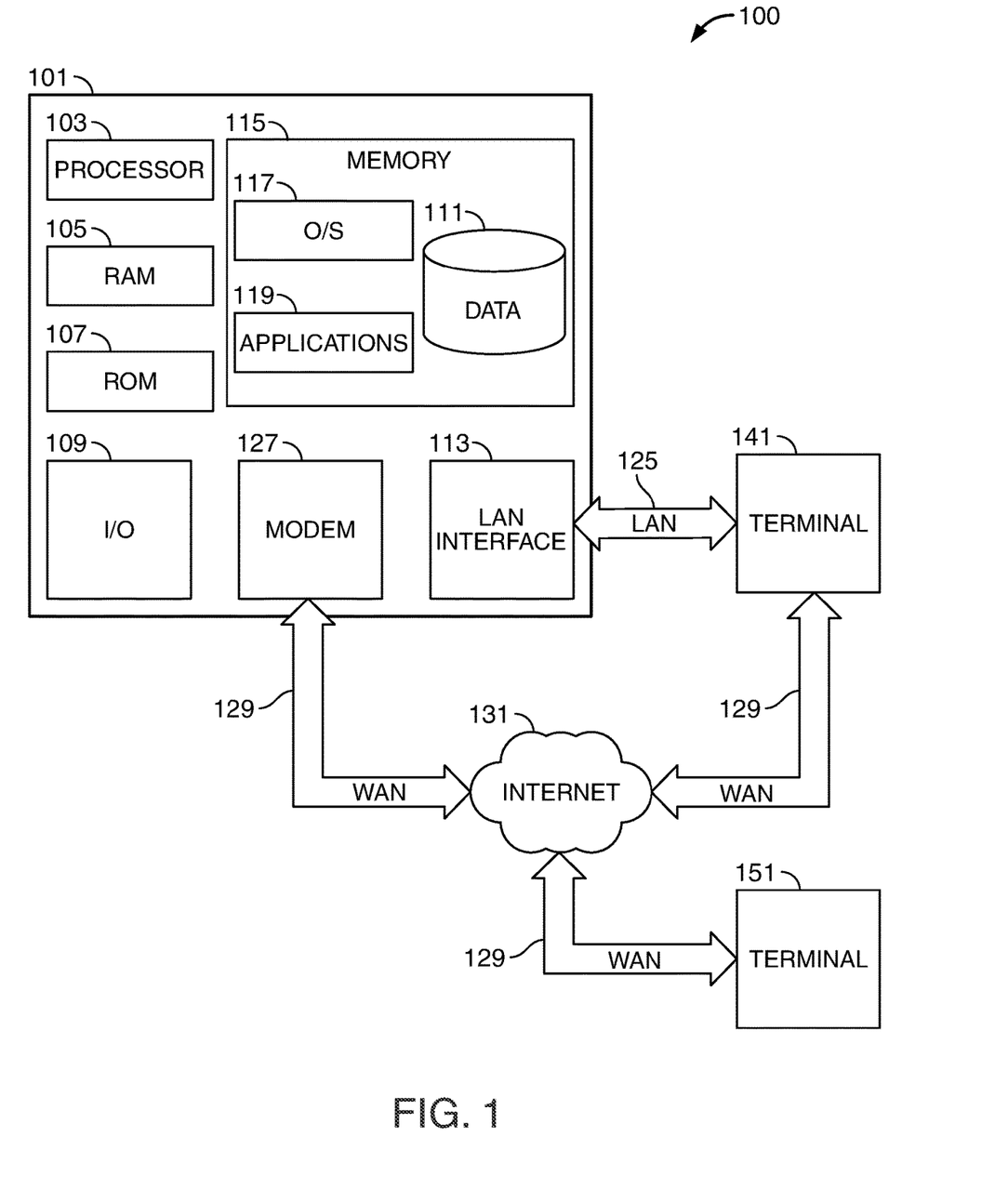
FIG. 1 shows an illustrative system in accordance with principles of the disclosure.

FIG. 1 shows an illustrative block diagram of system 100 that includes a centralized server 101. Server 101 may alternatively be referred to herein as a "computing device." Elements of system 100, including server 101, may be used to implement various aspects of the systems and methods disclosed herein. A "user" of system 100 or server 101 may include other computer systems or servers, or a human in the loop.

Server 101 may have a microprocessor 103 for controlling the operation of the device and its associated components, and may include RAM 105, ROM 107, input/output module 109, and a memory 115. The microprocessor 103 may also execute all software running on the server 101—e.g., the operating system 117 and applications 119 such as the AI decipher engine and security protocol. Other components commonly used for computers, such as EEPROM or Flash memory or any other suitable components, may also be part of the server 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as an AI decipher engine) along with any other data 111 (e.g., initial list of slang words or phrases) needed for the operation of the system 100. Memory 115 may also store videos, text, and/or audio files, such as a set of communications to be analyzed. The videos, text, and/or audio files may also be stored in cache memory, or any other suitable memory. Alternatively, some or all of computer executable instructions (alternatively referred to as "code") may be embodied in hardware or firmware (not shown). The microprocessor 103 may execute the instructions embodied by the software and code to perform various functions.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

In an embodiment of the server 101, the microprocessor 103 may execute the instructions in all or some of the operating system 117, any applications 119 in the memory 115, any other code necessary to perform the functions in this disclosure, and any other code embodied in hardware or firmware (not shown).

An input/output ("I/O") module 109 may include connectivity to a keyboard, monitor, or network interface through which higher hierarchal server or a user of server 101 may provide input. The input may include input relating to cursor movement. The input/output module 109 may also include one or more speakers for providing audio output and a video display device, such as an LED screen and/or touchscreen, for providing textual, audio, audiovisual, and/or graphical output (not shown). The input and output may be related to results from an analysis performed by the AI decipher engine through the processor 103.

System 100 may be connected to other systems, computers, servers, and/or the Internet 131 via a local area network (LAN) interface 113.

System 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers or servers that include many or all of the elements described above relative to system 100. The network connections depicted in FIG. 1 include a local area network (LAN) 125 and a wide area network (WAN) 29 but may also include other networks. Control circuit 501 may include a network interface controller (not shown), which may include a modem 127 and LAN interface or adapter 113, as well as other components and adapters (not shown). When used in a LAN networking environment, server 101 is connected to LAN 125 through a LAN interface or adapter 113. When used in a WAN networking environment, server 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for invoking user functionality related to performing various tasks. In an embodiment, application program(s) 119 may be cloud-based applications. In an embodiment, application program(s) 119 may be an AI decipher engine and a security protocol. The various tasks may be related to finding new slang words or phrases on the Internet and analyzing communications for hidden meaning.

Server 101 may also include various other components, such as a battery (not shown), speaker (not shown), a network interface controller (not shown), and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminal 151 and/or terminal 141 may be other devices such as remote servers.

Any information described above in connection with data 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
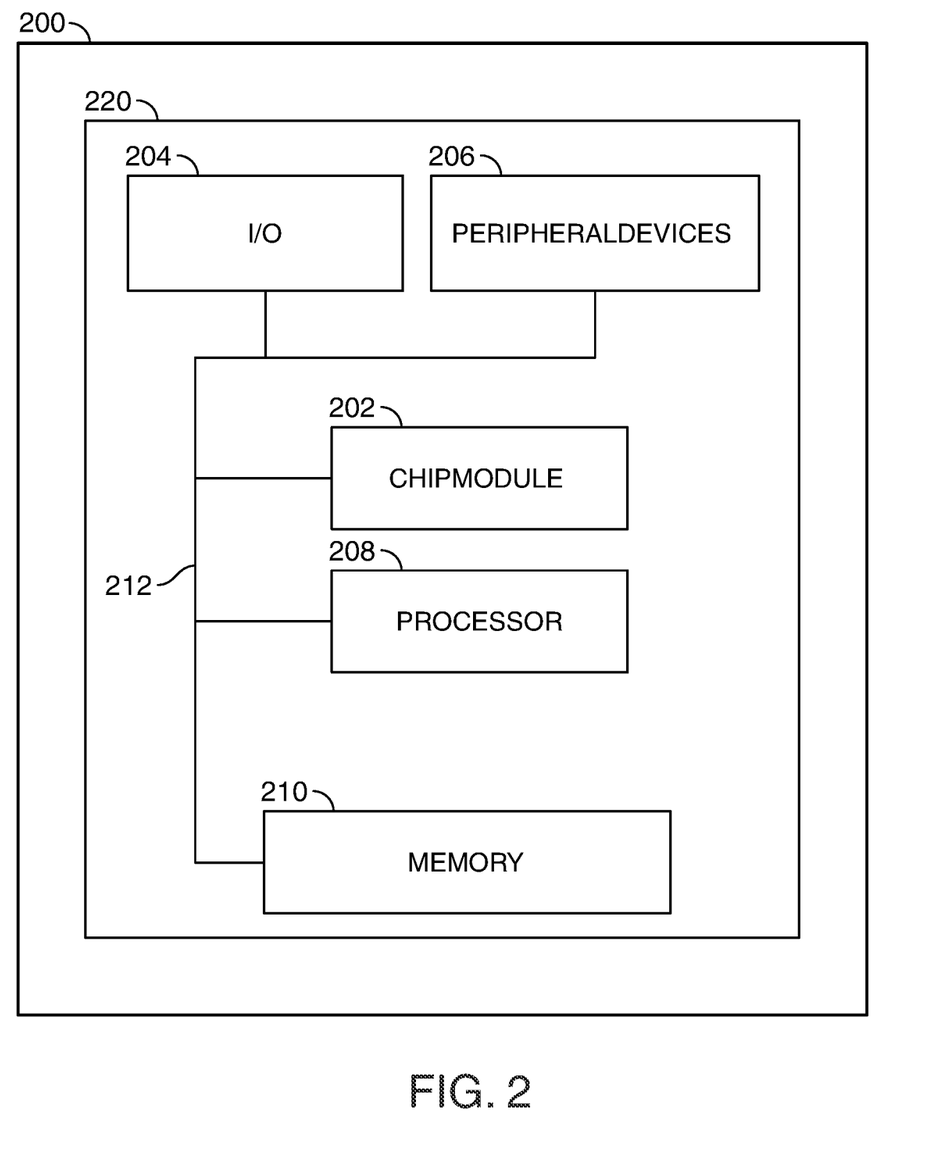
FIG. 2 shows an illustrative system in accordance with principles of the disclosure.

FIG. 2 shows illustrative apparatus 200 that may be configured in accordance with the principles of the disclosure. Apparatus 200 may be a centralized or distributed server. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an LED screen, a touchscreen or any other suitable media or devices; peripheral devices 206, which may include batteries and chargers, counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures.

Components 202, 204, 206, 208 and 610 may be coupled together by a system bus or other interconnections 212 and may be present on one or more circuit boards such as 220. In some embodiments, the components may be integrated into a single chip. The chip may be silicon-based.

Figure 3:
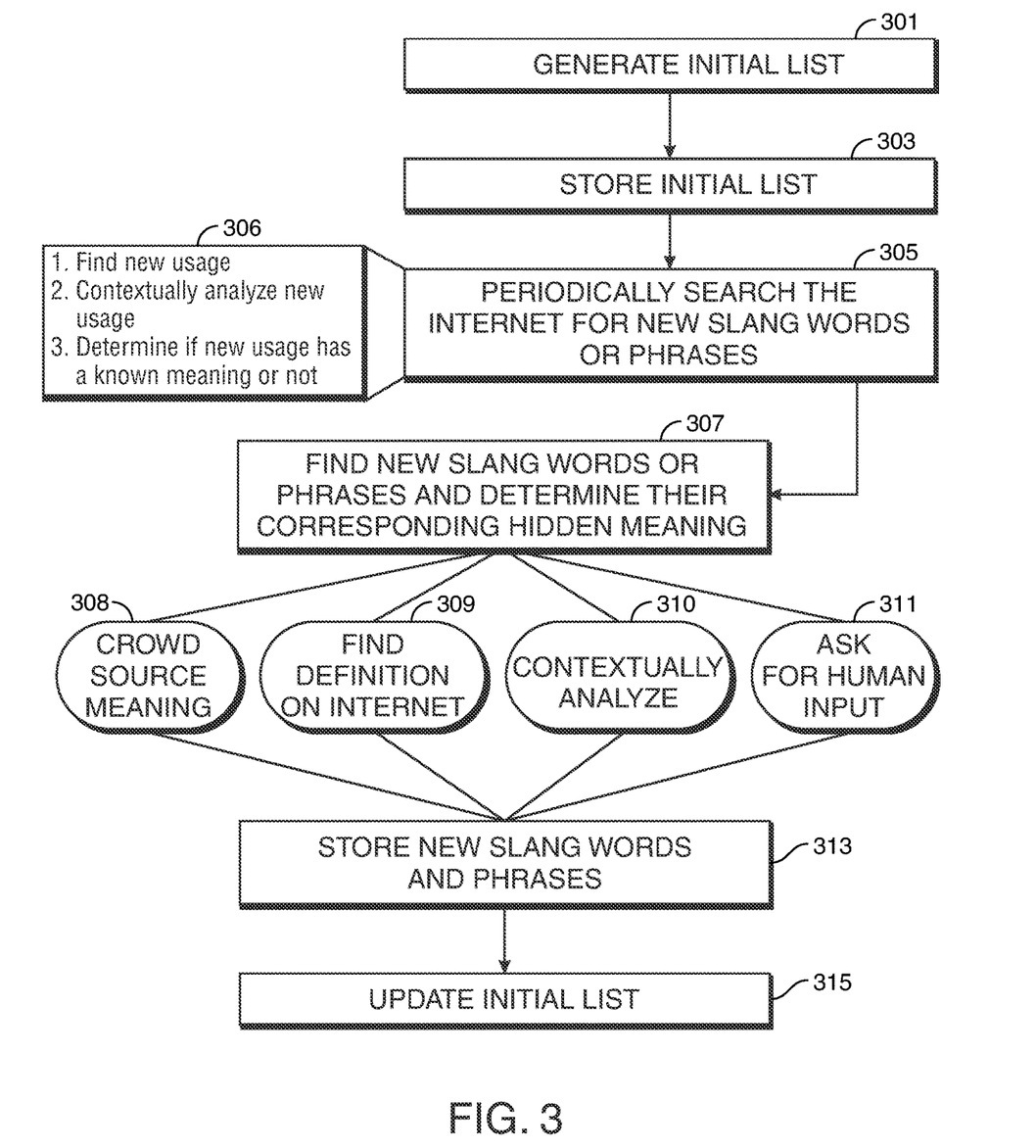
FIG. 3 shows an illustrative flowchart in accordance with principles of the disclosure.

FIG. 3 shows an illustrative method in accordance with the principles of the disclosure. Methods may include some or all of the method steps numbered 301 through 315. Methods may include the steps illustrated in FIG. 3 in an order different from the illustrated order. The illustrative method shown in FIG. 3 may include one or more steps performed in other figures or described herein. Steps 301 through 315 may be performed on the apparatus shown in FIGS. 1 and 2, or other apparatus.

At step 301, a computer server (centralized or distributed) may generate an initial list of slang words or phrases and the corresponding hidden/figurative meaning of each slang word or phrase on the initial list. The initial list may be automatically generated, or it may be manually entered by a user. In an embodiment, the initial list may be generated from one or more websites that contain a list of slang words or phrases and their corresponding definitions.

At step 303, the computer server may store the initial list of slang words or phrases and the corresponding hidden/figurative meaning of each slang word or phrase on the initial list. The initial list may be stored in any appropriate form of memory, including a database.

At step 305, the computer server, specifically an AI decipher engine located on the server, may periodically (or, in an embodiment, continuously) search the Internet for new slang words or phrases. A particular method of searching is described in step 306. At step 305/306, the AI decipher engine may find a new usage of a word or phrase on the Internet, contextually analyze the new usage, and then confirm or determine if the new usage has a known meaning or not. If it has a known meaning in context, then the new usage is not a new slang word or phrase. If it does not have a known meaning in context, it is more likely than not that the new usage is a new slang word or phrase.

At step 307, the AI decipher engine may determine the corresponding hidden/figurative meaning of any new slang word or phrase discovered at steps 305/306. Steps 308, 309, 310, and 311 are different possible methods for the AI decipher engine to determine the corresponding hidden/figurative meaning. The AI decipher engine may use one or all of the methods in steps 308-311. In an embodiment, the AI decipher engine may start with one method 308-311 and continue with the remaining methods until it decides that it has more likely than not discovered the hidden/figurative meaning behind the new slang words or phrases. In alternative embodiments, the threshold may be at a different level, such as 75% confidence, or 95% confidence, or 99% confidence. There may be other possible methods as well.

At step 308, the AI decipher engine may crowdsource the corresponding hidden meaning. For example, the AI decipher engine may post a question on a website (Internet, or, in an embodiment, an internal, non-public website) asking, e.g., "what does 'new slang word or phrase' mean?". After a pre-determined amount of time (e.g., a day, week, month), the AI decipher engine may accept a crowd-sourced answer based on various characteristics of the answer (e.g., most common, highest ranked, etc.).

At step 309, the AI decipher engine may discover the definition (i.e., the hidden/figurative meaning) on the Internet. For example, the AI decipher engine may check a particular website, or websites, that contain definitions of slang words and phrases. In an embodiment, this may be the first method the AI decipher engine tries.

At step 310, the AI decipher engine may determine the corresponding hidden/figurative meaning by contextually analyzing the usage of the new slang word or phrase. The AI decipher engine may analyze the usage in context with surrounding words, sentences, paragraphs, as well as the author, recipient, and location of the new usage. Any other characteristic of the new usage that provides context may also be analyzed (such as emphasis, spelling, punctuation, etc.).

At step 311, the AI decipher engine may ask for human input as to the corresponding hidden/figurative meaning of the new slang words or phrases. In an embodiment, this may be the final method employed by the AI decipher engine. If the AI decipher engine cannot determine the corresponding hidden/figurative meaning any other way, it may decide that only a user can provide the definition. Asking for help may also highlight to a user that there is a new slang word or phrase out there that bears watching, even if the definition is unknown.

At step 313, the AI decipher engine, through the processor, may store the new slang words and phrases, and their corresponding hidden/figurative meaning in memory, including a database. Next, at step 315, the initial list of slang words and phrases (and their definitions) may be updated to include the newly discovered slang words and phrases. In an embodiment, the initial list and updated list are kept separate. In another embodiment, the updated list may replace the initial list and become the new initial list the next time the AI decipher engine runs. In an embodiment, the AI decipher engine runs continuously and constantly updates the initial list.

Figure 4:
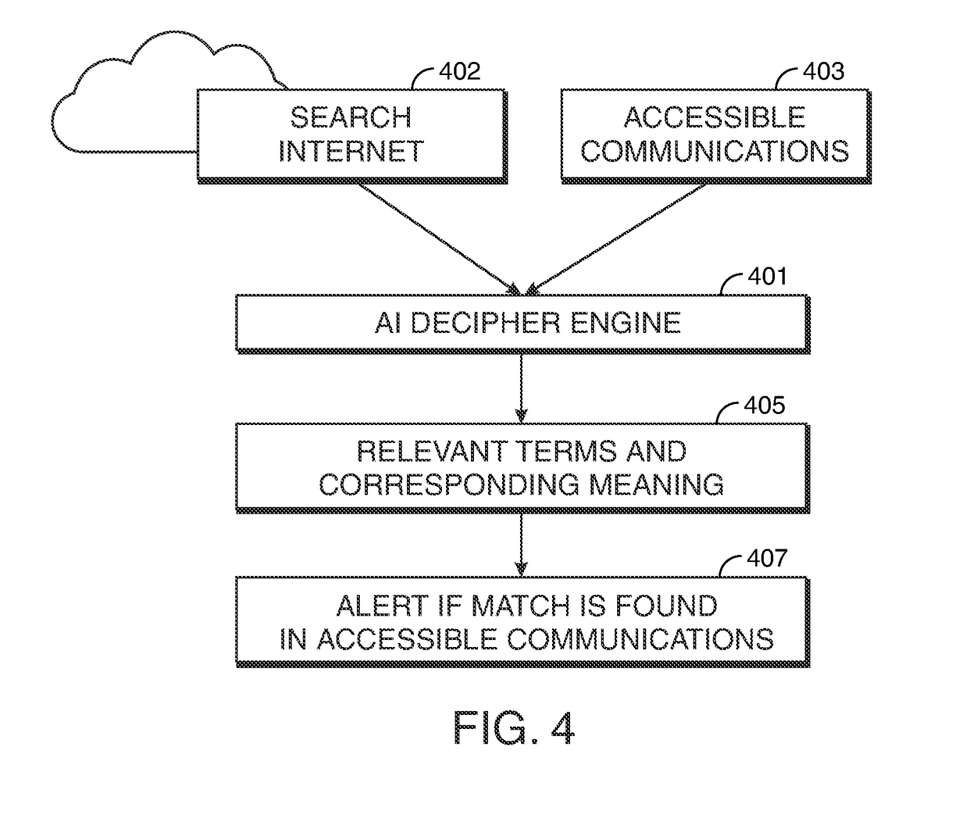
FIG. 4 shows an illustrative flowchart in accordance with principles of the disclosure.

FIG. 4 shows an illustrative method in accordance with the principles of the disclosure. Methods may include some or all of the method steps or components numbered 401 through 407. Methods may include the steps and components illustrated in FIG. 4 in an order different from the illustrated order. The illustrative method shown in FIG. 4 may include one or more steps performed in other figures or described herein. Components/steps 401 through 407 may be performed on the apparatus shown in FIGS. 1 and 2, or other apparatus.

Component 401 may be the AI decipher engine described herein. At step 402, the AI decipher engine may search the Internet for new slang words or phrases as described in this disclosure. At step 403, the AI decipher engine may monitor accessible communications. Accessible communications may include emails, social media posts, text messages, voice calls (once converted from voice to text through any appropriate method), real-time video (converted to text through any appropriate method), or any other communications the AI decipher engine has access to. The AI decipher engine cannot monitor communications inaccessible to it, such as private emails outside of the organization employing the AI decipher engine.

At step 405, the AI decipher engine may compare the accessible communications 403 to a list of relevant terms and their corresponding hidden/figurative meanings, in order to determine if the accessible communications contain any relevant hidden meanings. In an embodiment, all slang words or phrases are relevant. In another embodiment, only certain slang words or phrases are relevant, and relevancy may be determined by comparing the definitions to a pre-determined list of relevant terms. For example, a financial institution may determine that terms related to money laundering, financial fraud, securities violations or other crimes may be relevant. In contrast, an educational institution may be more interested in cheating or drug crimes. The relevant terms may be highly user specific.

Whatever the relevant terms are to a particular user, at step 405, the AI decipher engine may compare the accessible communications 403 to the relevant terms. At step 407, the AI decipher engine may generate an alert if a match is found between the relevant terms and the accessible communications. An alert may include notifying a physical security entity (e.g., a security guard or an internal affairs agent). In an embodiment, an alert may simply be a notification to an interested party, such as a supervisor or manager. In another embodiment, an alert may be an internal alert to the AI decipher engine for it to take a further and closer look at other communications by the author of the original accessible communication that caused the alert. In an embodiment, the alert may simply be a flag of the communication for further follow-up b either the AI decipher engine or a human user.

Figure 5:
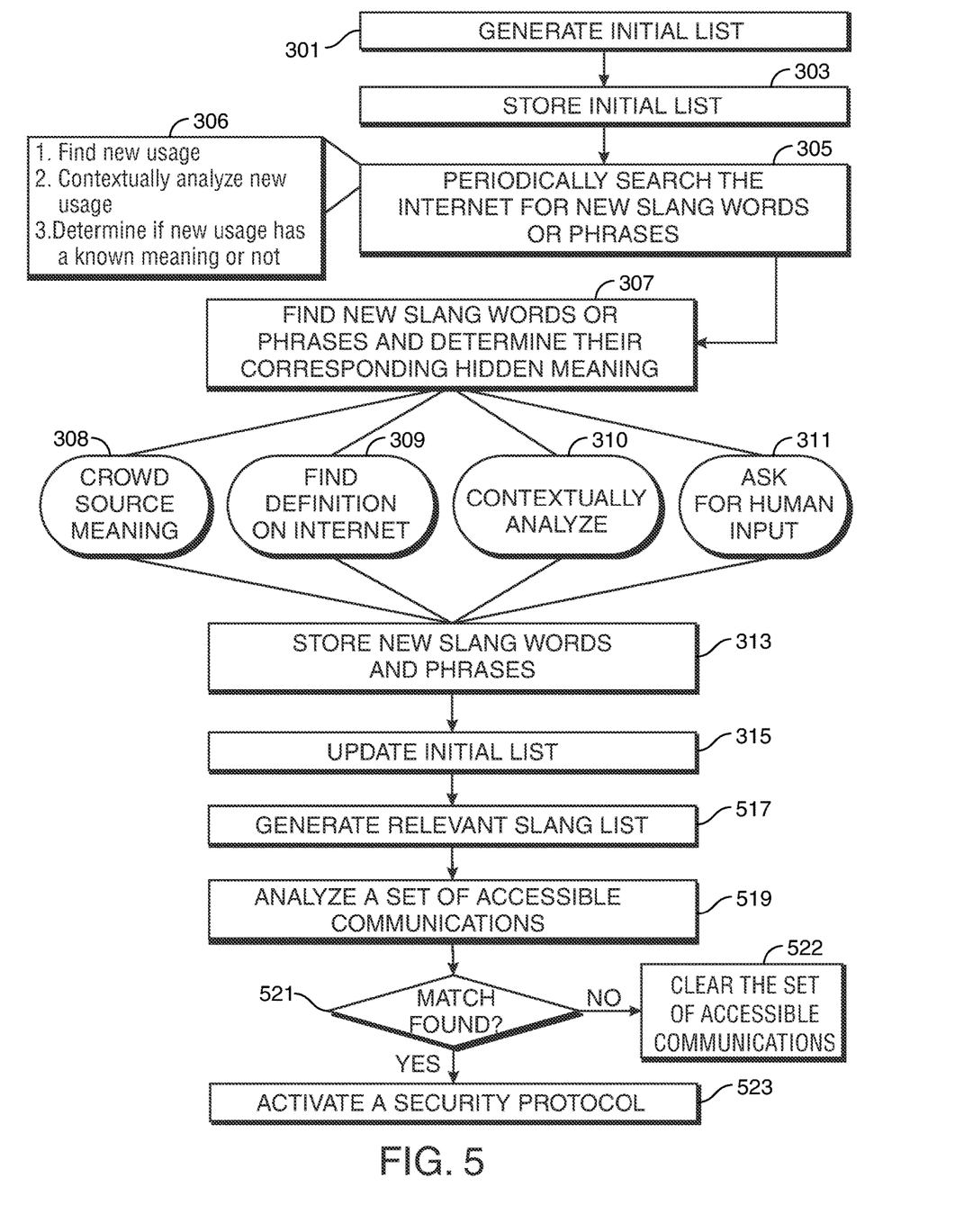
FIG. 5 shows an illustrative flowchart in accordance with principles of the disclosure.

FIG. 5 shows an illustrative method in accordance with the principles of the disclosure. Methods may include some or all of the method steps numbered 301 through 523. Methods may include the steps illustrated in FIG. 5 in an order different from the illustrated order. The illustrative method shown in FIG. 5 may include one or more steps performed in other figures or described herein. Steps 301 through 523 may be performed on the apparatus shown in FIGS. 1 and 2, or other apparatus. Steps 301 through 315 are those shown in FIG. 3 and are discussed above with respect to FIG. 3.

At step 517, the AI decipher engine may generate a relevant slang list. In an embodiment, slang words or phrases may be deemed relevant by the AI decipher engine by comparing the corresponding hidden meaning for each slang word or phrase on the updated or initial list to a pre-determined list of relevant terms provided to the AI decipher engine by a user. For example, a financial institution may be interested in slang words or phrases that implicate fraud, money laundering, securities fraud, compliance issues, insider trading, or other criminal activity. In an embodiment, a financial institution may also be interested in terms related to investments or other profit-generating ideas.

If a slang word or phrase's corresponding hidden/figurative meaning has one of these terms, the slang word or phrase may be added to the relevant slang list by the AI decipher engine. As not all slang may be relevant for all users (e.g., a school may be interested in academic dishonesty but uninterested in money laundering), a relevant slang list may allow for faster and more accurate language processing. In an embodiment, all slang words or phrases are relevant as they may indicate that something is being hidden from the user.

At step 519, the AI decipher engine may analyze a set of accessible communications by comparing the contents of the communications to the relevant slang list generated at step 517. In an embodiment, the comparison is simply checking to see if a word or phrase on the relevant terms list appears in the communications. In another embodiment, the AI decipher engine goes deeper and contextually analyzes each appearance of a term from the relevant terms list to determine if the usage was innocuous or if there is a hidden/figurative meaning.

At step 521, the AI decipher engine determines if there is a match between the contents of a set of accessible communications and the relevant slang list. At step 522, if there is no match, the set of accessible communications may be cleared (i.e., deleted) from the database. In an embodiment, the set of accessible communications may be cleared, meaning that a note or entry may be entered indicating that these communications have no relevant hidden/figurative meanings. However, the set of accessible communications may not be removed from the database.

At step 523, if a match is found between the contents of the set of accessible communications and the relevant slang list, a security protocol may be activated. In alternative embodiments, the security protocol may include alerting a physical security entity such as a security guard. The security protocol may include performing a more comprehensive search of the communications of the author(s) of the flagged communication(s). The security protocol may include simply flagging the author or communication(s) for further review. The security protocol may include notifying a supervisor or manager. The security protocol may include generating an internal (to the AI decipher engine) security flag for later follow-up.

In an alternative embodiment, instead of activating a security protocol, if a match is found, the AI decipher engine may pass its results onto an NLP algorithm for incorporation into the NLP algorithm's interpretation of the communication.

Figure 6:
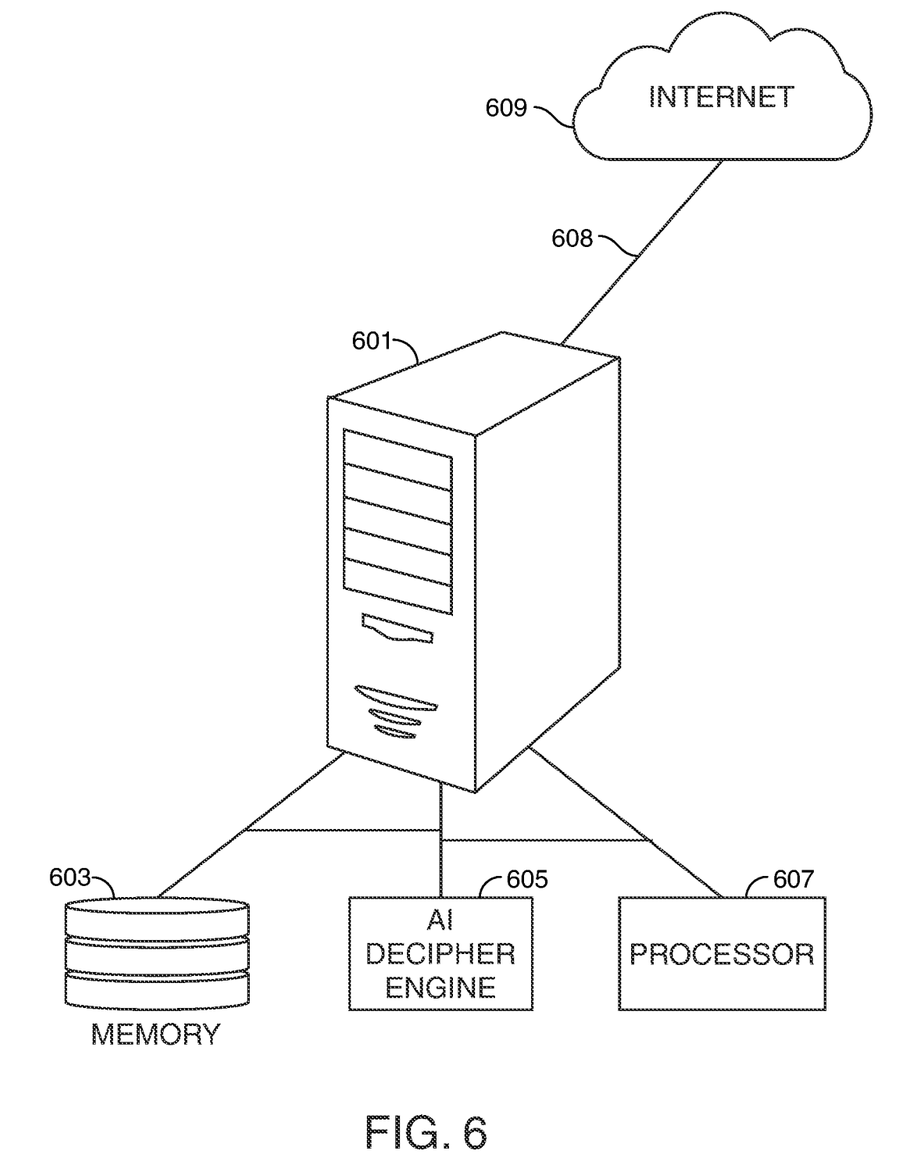
FIG. 6 shows an illustrative system in accordance with principles of the disclosure.

FIG. 6 shows illustrative apparatus 601 that may be configured in accordance with the principles of the disclosure. Apparatus 601 may be a centralized or distributed server. Apparatus 601 may include one or more features of the apparatus shown in FIGS. 1 and 2.

Apparatus 601 may include memory 603, which may include a database, AI decipher engine 605, and processor 607, among other components (not shown). Memory 603, AI decipher engine 605, and processor 607 may be electronically coupled to each other. AI decipher engine 605 may be executable code stored in memory 603 and run by processor 607. In an embodiment, processor 607 may have multiple cores or may consist of multiple processors (with single or multiple cores each).

Apparatus 601 may include communication link 608 configured to access the Internet 609.

AI decipher engine 605, may be designed to search for slang words or phrases, determine their corresponding hidden/figurative meaning(s), and contextually analyze communications, in accordance with the principles of this disclosure.

In an embodiment, apparatus 601 may be a single representation of a plurality of distributed servers. Distributing the searching and analysis may increase processing speed and responsiveness. In another embodiment, the AI decipher engine may be located in the cloud and may be able to utilize as many distributed computing resources as necessary to perform its functions in a timely and accurate manner.

Thus, apparatus and methods to contextually decipher and analyze hidden/figurative meaning in communications have been provided. Persons skilled in the art will appreciate that the present invention can be practiced by other than the described embodiments, which are presented for purposes of illustration rather than of limitation.

What is claimed is:

1. A method for deciphering hidden meaning in communications, the method utilizing a world-wide network (the "Internet"), the method comprising:
   generating, at a distributed network comprising multiple servers, an initial list of slang words or phrases in a target language and a corresponding hidden meaning for each slang word or phrase of the initial list of slang words or phrases;
   storing, at the distributed network, the initial list of slang words or phrases and the corresponding hidden meaning of each slang word or phrase;
   searching, periodically, the Internet, using a text-based artificial intelligence ("AI") decipher engine located on the distributed network, for new slang words or phrases;
   finding a plurality of new slang words or phrases;
   determining, at distributed network centralized server by the AI decipher engine, a corresponding hidden meaning for each of the plurality of new slang words or phrases;
   storing, in a database at the distributed network, the new slang words or phrases and their corresponding hidden meaning;
   updating, at the distributed network, the initial list of slang words or phrases and their corresponding hidden meaning with the new slang words or phrases and their corresponding hidden meaning to form an updated version of the initial list;
   generating, at the distributed network, a relevant slang list from the updated version of the initial list, wherein slang is determined relevant by the AI decipher engine by comparing the corresponding hidden meaning for each slang word or phrase to a pre-determined list of relevant terms provided to the AI decipher engine;
   storing, in a database at the distributed network, the relevant slang list;
   analyzing, at the distributed network, a set of past communications by at least one author for hidden meaning by comparing the set of communications with the relevant slang list; and
   when a match between the set of past communications and the relevant slang list is found, activating a security protocol and locking the at least one author out of an internal network;
   wherein, the searching for new slang words or phrases comprises:
      finding a new usage of a word or phrase;
      analyzing the new usage in context with surrounding words or phrases; and
      confirming that the new usage in context matches no known meaning of the word or phrasei and wherein the corresponding hidden meaning of the new slang words is determined by:
   automatically posting a question as to the corresponding hidden meaning on one or more websites; and
   accepting a crowd-sourced answer after a pre-determined period of time.

2. The method of claim 1 wherein the target language is English.

3. The method of claim 1 wherein the corresponding hidden meaning of the new slang words is further determined by discovering, by the AI decipher engine, a definition on the Internet.

4. The method of claim 1 wherein the corresponding hidden meaning of the new slang words is further determined by contextually analyzing, at the centralized server and using the AI decipher engine, usage of the new slang word on the Internet.

5. The method of claim 1 wherein the corresponding hidden meaning of the new slang words is further determined by:
   alerting a user that the corresponding hidden meaning is indeterminate; and
   in response to the alerting, receiving the corresponding hidden meaning from the user.

6. The method of claim 1 wherein the searching is limited to a pre-determined portion of the Internet.

7. The method of claim 6 wherein the pre-determined portion of the Internet is a part of the Internet not indexed by search engines and comprises publicly visible websites that hide internet protocol ("IP") addresses of servers that run the websites (the "dark web").

8. The method of claim 1 wherein the period of the searching is once per day.

9. The method of claim 1 wherein the security protocol includes pulling a set of all accessible communications by the at least one author and analyzing the set of all accessible communications for hidden meaning.

10. The method of claim 1 wherein the security protocol includes alerting a physical security entity in real-time.

11. A system for deciphering hidden meaning in communications, the system utilizing a world-wide network (the "Internet"), the system comprising:
    a central server, the central server comprising:
       a communication link configured to access the Internet;
       a memory configured to store at least:
          an initial list of slang words or phrases in a target language and their corresponding hidden meaning;
          an operating system; and
          a text-based artificial intelligence ("AI") decipher engine configured to:
             search, periodically, the Internet, for new slang words or phrases;
             determine a corresponding hidden meaning for the new slang words or phrases; and
             analyze a set of communications for hidden meaning; and
       at least one processor coupled to the memory and configured to:

operate the AI decipher engine and the operating system;

for each hidden meaning found in the set of communications, activate a security protocol;

communicate the results of the analysis by the AI decipher engine; and store, in the memory within the central server, the new slang words or phrases and their corresponding hidden meaning as an update to the initial list;

wherein, the AI decipher engine searches for new slang words or phrases by, at least:

finding a new usage of a word or phrase on the Internet;

analyzing the new usage in context with surrounding words or phrases; and determining if the new usage in context matches a known meaning of the word or phrase; and wherein, the AI decipher engine analyzes the set of communications for hidden meaning by, at least:

comparing the set of communications with the initial list of slang words or phrases and the new slang words or phrases and finding each instance of a slang word or phrase in the set of communications;

determining if the slang word or phrase found in the set of communications has a standard meaning or hidden meaning in context with the set of communications in which the slang word or phrase is found;

automatically posting a question as to the corresponding hidden meaning on one or more websites; and accepting a crowd-sourced answer after a pre-determined period of time..

12. The system of claim 11 wherein the corresponding hidden meaning of the new slang words is determined by discovering, by the AI decipher engine, a definition on the Internet.

13. The system of claim 11 wherein the corresponding hidden meaning of the new slang words is determined by contextually analyzing, at the centralized server and using the AI decipher engine, usage of the new slang word on the Internet.

14. The system of claim 11 wherein the corresponding hidden meaning of the new slang words is determined by:

alerting a user that the corresponding hidden meaning is indeterminate; and receiving the corresponding hidden meaning from the user.

15. The system of claim 11 wherein the corresponding hidden meaning of the new slang words is determined by:

automatically posting a question as to the corresponding hidden meaning on one or more websites; and accepting a crowd-sourced answer after a pre-determined period of time.

16. A method of deciphering figurative meaning in a communication, the method comprising:

generating and storing, at a distributed network comprising multiple servers, a list of slang words or phrases in a target language and a corresponding figurative meaning for each slang word or phrase of the list of slang words or phrases;

receiving, at the distributed network, a set of communications from at least one author comprising at least one word in the target language;

analyzing, at the distributed network using an artificial intelligence ("AI") decipher engine, the set of communications;

confirming that the set of communications contains a figurative meaning; and activating a security protocol when the set of communications contains a figurative meaning;

wherein, the analysis of the set of communications comprises:

comparing the at least one word to the list of slang words or phrases;

noting each instance of a slang word or phrase from the list in the set of communications; and confirming whether each instance of the slang word or phrase found in the set of communications has a standard meaning or figurative meaning in context with the set of communications in which the slang word or phrase is found.

17. The method of claim 16 wherein the security protocol includes pulling a set of all accessible communications by the at least one author and analyzing the set of all accessible communications for figurative meaning.

* * * * *